United States Patent [19]

Wu

[11] Patent Number: 5,492,883
[45] Date of Patent: Feb. 20, 1996

[54] MOLECULAR SIEVE STRUCTURES USING AQUEOUS EMULSIONS

[75] Inventor: Shy-Hsien Wu, Horseheads, N.Y.

[73] Assignee: Corning Incorporated, Corning, N.Y.

[21] Appl. No.: 342,834

[22] Filed: Nov. 21, 1994

[51] Int. Cl.[6] .............................. B01J 21/04; B01J 23/02
[52] U.S. Cl. ............................ 502/439; 502/64; 502/242; 502/263; 502/349; 502/524; 502/527
[58] Field of Search ........................... 502/64, 242, 263, 502/349, 439, 524, 527

[56] References Cited

U.S. PATENT DOCUMENTS

| | | | |
|---|---|---|---|
| 3,090,691 | 5/1963 | Weyer | 106/39 |
| 4,631,267 | 12/1986 | Lachman et al. | 502/439 |
| 4,631,268 | 12/1986 | Lachman et al. | 502/527 |
| 4,637,995 | 1/1987 | DeAngelis et al. | 502/527 |
| 5,053,092 | 10/1991 | Lachman | 502/527 |
| 5,349,117 | 9/1994 | Grasselli et al. | 585/820 |
| 5,417,947 | 5/1995 | Hertl et al. | 585/820 |

FOREIGN PATENT DOCUMENTS 0197645  6/1990  European Pat. Off. .

OTHER PUBLICATIONS

"Engineering Property Data on Selected Ceramics, vol. III, Single Oxides", Jul. 1981; Metals and Ceramics Info. Center; Battelle, Columbus Laboratories, Columbus, OH; A Dept. of Defense Info. Analysis Center; MCIC–HB–07–vol. III.

*Primary Examiner*—Sharon Gibson
*Attorney, Agent, or Firm*—Timothy M. Schaeberle; Angela N. Nwaneri

[57] ABSTRACT

The invention relates to the use of aqueous emulsions of silicone resins in forming cellular zeolite substrates which can be dried rapidly without incurring blistering while still exhibiting good strength and zeolite activity.

16 Claims, No Drawings

5,492,883

MOLECULAR SIEVE STRUCTURES USING AQUEOUS EMULSIONS

BACKGROUND OF THE INVENTION

The invention relates to an improved zeolite structure and a method for making such structure. In particular, it relates to a composition for such structures using solvent-free vehicle, and a method for forming cellular zeolite structures such as extruded honeycomb monoliths from such compositions.

Unlike high surface area oxides such as alumina, titania, spinel, zirconia, silica and the like, which have been known in the an for many years for being readily extrudable into high strength support such as honeycomb structures used for filters and for catalyst supports, zeolites have not been readily available in extruded form. This is due to some significant differences between zeolites and high surface area oxides which make zeolites difficult to form into large complex shapes such as honeycombs.

Recently it has been disclosed that significantly higher strengths can be obtained by incorporating permanent binders such metal oxides (silica, titania, alumina etc.) in their dry state into such high surface area batches. It has also been disclosed that even higher strengths can be achieved in such systems if the permanent binder is incorporated in the form of a precursor of the permanent binders.

More recently, it has been disclosed in co-assigned U.S. Ser. No. 08/304,157, that zeolite structures can be made with the use of silicone resin as a permanent binder. As disclosed in the reference, except for silica, precursors of the permanent binder can be used in the form of a dispersion, suspension, or solution in a liquid diluent. When the precursor of the permanent binder is silicone resin, the resin is dissolved in a solvent or a mixed solvent system of alcohol and water. The silicone resin can be mixed directly with porous oxide powders, in which case a solvent is used during the plasticizing step to dissolve the resin. Alternatively, the silicone resin can be predissolved in an appropriate organic solvent such as methyl alcohol, ethyl alcohol and isopropyl alcohol. Whether the silicone resin is predissolved in a solvent or mixed directly with the porous oxide powders, the resins are preferably milled first to a particle size finer than 20 microns, and more preferably, finer than 10 microns.

There are problems associated with solvent-based systems such as OSHA concerns (toxicity and flammability) due to the presence of strong organic solvent vapor during mixing and extrusion. There are also other concerns such as low yield. Volatile solvents tend to cause blistering and cracking under normal dielectric drying of such structures due to a rapid forming of dry skin over the substrates. To minimize the occurrence of such problems, the structures are generally dried at very slow rates in a ventilating hood over a period of several days. The slow drying is due to the tendency of such structures to rapidly form a dry skin over the substrate from the volatile substrate which also causes blistering and cracking when such structures are subjected to dielectric drying. As a result, structures formed from solvent-containing batches require slow drying in a ventilating hood, typically over a period of days to minimize the occurrence of blisters and cracks.

While and co-assigned application, U.S. Ser. No. 08/304, 157 offers significant improvement over the previously known compositions and methods of forming cellular zeolite structures, further improvements can be made. Accordingly, it is a principal objective of the present invention to provide an improved composition and method for making cellular zeolite structures.

SUMMARY OF THE INVENTION

Briefly, the present invention provides a method of forming molecular sieve structures, particularly cellular zeolites structures such as extruded honeycomb monoliths, using aqueous emulsions of silicone resins. In particular, the invention provides a crack-free, cellular sintered zeolite structure formed by (1) providing a batch composition containing molecular sieve material, aqueous silicone resin emulsion, a temporary binder, and water; (2) shaping the batch to form a green, cellular structure; (3) drying the green body; and (4) firing the green cellular structure at a temperature and for a duration of time sufficient to form a crack-free, cellular structure having substantial strength. Preferably, the green body is dried in a dielectric oven over a relatively short period of time. For most applications, I have found that the green body can be sufficiently dried in a dielectric oven within a period of 30 minutes or less.

As used in this specification:

"high-silica zeolite" refers to those zeolites having a $SiO_2/Al_2O_3$ molar ratio which exceeds about 10 and for some applications, greater than 100; any silica/alumina ratio can be used in this invention, however, it is preferable to use high or very high silica/alumina ratio for thermal stability;

"molecular sieve" refers to crystalline substances or structures having pore sizes suitable for adsorbing molecules. The term is generally used to describe a class of materials that exhibit selective absorptions properties. To be a molecular sieve, the material must separate components of a mixture on the basis of molecular size and shape differences. Such materials include silicates, the metallosilicates, metalloaluminates, the $AlPO_4$, silico- and metalloaluminophosphates, zeolites and others described in R. Szostak, *Molecular Sieves: Principles of Synthesis and Identification*, pages 2–6 (Van Nostrand Reinhold Catalysis Series, 1989);

"zeolites" are crystalline aluminosilicates whose structures are based on a theoretically limitless three-dimensional network of $AlO_x$ and $SiO_y$ tetrahedra linked by the sharing of oxygen atoms, such as more fully disclosed in U.S. Pat. No. 3,702,886, in British Specification No. 1,334,243, published Oct. 17, 1973, in U.S. Pat. Nos. 3,709,979, and in 3,832,449, all of which are herein incorporated by reference;

"monolithic substrate" is any unitary body or substrate formed from, or incorporating molecular sieve material; as used herein, a honeycomb substrate is a form of a monolithic substrate, but a monolithic substrate is not necessarily a honeycomb substrate;

DETAILED DESCRIPTION OF THE INVENTION

The presence of flammable and sometimes toxic solvents in zeolite compositions poses both health and environmental concerns, particularly in a production environment involving large scale operations utilizing very large amounts of volatile solvents. Other problems associated with solvent-based systems include the need to safely dispose of spent solvents as well as the sometimes high costs due to the use of relatively expensive organic solvents in such systems. Also, solvent-containing systems require very long periods to dry. In particular, such systems cannot be effectively dried in a dielectric oven.

The present invention eliminates the need for complicated and expensive OSHA requirements for formulation, operation and disposal of solvent-based systems and costly explosion-proof facilities. Being essentially a solvent-free system, the present invention is significantly less expensive than previously known solvent-based systems. Further, the present system essentially eliminates or at least significantly reduces any OSHA concerns. More significantly, the present system results in a structure which can be dried in a dielectric oven over a very short period of time.

The general method of producing a porous sintered support or substrate from high surface area oxides is well known to persons skilled in the art. Such method generally includes the steps of mixing batch materials, blending the mixture, forming or shaping the batch into a green body, drying, and subsequently sintering the green body to form a hard porous structure. Also, it is customary to add such additives as lubricants, plasticizers, and burnout agents (e.g., graphite) to the batch during the mixing step as needed to control such properties as viscosity of the batch as well as the strength and porosity of the fired body. In addition to raw materials, porosity is also dependent on the firing temperature. The higher the firing temperature, the more dense (less porous) the resulting fired structure.

While the zeolite structure of the invention can be prepared in a manner similar to those employed in forming high surface area oxides, there are significant differences between zeolites, the preferred molecular sieve material of the invention, and high surface area oxides. One major distinction between zeolites and high surface area oxides is in the size of the particles. High surface area oxides consist of very small particles of size in the order of nanometers. The high surface area of such oxides is as a result of the cumulative surfaces of these small particles. Zeolites, on the other hand, comprise much larger particles (size in the order of several microns), having a regular array of accessible micropores. It is this structure of micropores which provide the high surface area of zeolites. Another significant difference between high surface area oxides and zeolites is that high surface area oxides tend to sinter together or coalesce during sintering to provide strength to the sintered product. However, as a result of the sintering together, the surface area of these oxides is compromised. By contrast, zeolites do not sinter together or coalesce to any significant degree. As a result, both surface area and strength are maintained during sintering of zeolites.

I have found that the main objective of the invention, that is, to provide a composition using a solvent-free vehicle for forming zeolite structures, preferably, for forming extruded zeolite honeycomb structures having substantial strength and high surface area alter firing, can be achieved by (1) forming a batch composition by combining (a) molecular sieve material, preferably a zeolite, (b) aqueous silicone resin emulsion, (c) a temporary binder, preferably a water soluble organic binder, and (d) water; (2) forming the composition into a monolithic structure such as a honeycomb structure; (3) drying the structure to form a crack-free monolith; and (4) sintering the structure to form a porous sintered structure having substantial strength.

Prior to sintering the structure, the drying step is accomplished by placing the structure in an oven at a temperature in the range of 50° to 100° C., preferably, at a temperature in the range of 90° to 100° C. In a particularly preferred embodiment, the drying step is accomplished by placing the green structure in a dielectric oven for a period of time sufficient to form a crack-free, self-supporting structure. Preferably, the green body is dried in a dielectric oven for a duration of no greater than 60 minutes, more preferably for a duration of 5 to 30 minutes.

Preferred molecular sieves for the invention include silicates (such as the metallosilicates and titanosilicates), metalloaluminates (such as germaniumaluminates), metallophosphates, aluminophosphates (such as silico- and metalloaluminophosphates (MeAPO), SAPO, MeAPSO), gallogerminates and combinations of these. Examples of useful metallosilicates include zeolites, gallosilicates, chromosilicates, borosilicates, ferrisilicates. Useful zeolites for the practice of the invention include mordenite, ultrastabilized Y (USY), ZSM-5, ZSM-8, ZSM-11, ZSM-12, Hyper Y, beta-zeolites, H-ferrierite, H-offretite, HL powder, faujasite, X zeolite, type L zeolite, mazzite, EMC-2, MAPO-36, AlPO4-5, AlPO4-8, VPI-5, and combinations of these, preferably silicalite, and any of the natural zeolites including erionite, clinoptilolite, chabazite, and phillipsite.

A key aspect of the invention is the use of aqueous silicone resin emulsions in place of solvent-based systems. Any aqueous silicone resin emulsion can be used for the invention. I have found certain aqueous silicone resin emulsions such as the phenylmethyl silicone resin emulsions available from Dow Coming Corporation, Midland, Mich., and sold under the designations 1-0468 and 1-0469 for example, are particularly useful for the practice of the invention. These silicone resin emulsions are characterized by about 60 weight percent resin solids which sinter to yield about 52% silica, particle size in the order of 7000 Angstroms, and may contain very small amounts (0.5 to 1 lb/gal of the emulsion) of an organic aromatic solvent. Preferably, the composition contains sufficient zeolite to yield a final sintered structure having a zeolite to silica ratio in the range of 70 to 90 zeolite/30 to 10 silica by weight.

An advantage of the support of the invention is that superior porosity and strength are maintained while eliminating the use of toxic and flammable solvents from such systems. Depending on the application, the inventive structure may exhibit a total porosity of 20–75%, preferably 20–60 %. Zeolites are known to retain their high surface area during firing. High porosity is also achieved because zeolites do not undergo excessive shrinkage during the sintering step. As a result, the structure of the invention is well within the surface area requirements of many catalyst support applications. Generally, such applications require substantial overall surface area of at least 20 $m^2/g$, preferably greater than 100 $m^2/g$, and most preferably greater than 150–200 $m^2/g$. Overall surface area in excess of 200 $m^2/g$ are readily obtained in the support structure of the invention due to the minimal firing shrinkage and other advantageous properties of zeolites.

In addition to porosity and surface area, catalytic and filter applications require a flexural strength, measured as the modulus of rupture (MOR), of greater than 500 pounds per square inch (psi) (3,447 kPa), more preferably, 1000 psi (6,995 kPa), and most preferably 1500 psi (10,342 kPa). I have found that the structure of the invention exhibits flexural strengths that meet or exceed these limits.

To determine the MOR, a rod was extruded from the above composition, the extruded rod was fired and supported at two points along its length and a load was applied to the rod midway between the two support points. The load was gradually increased until the rod broke. The modulus of rupture was calculated as $$M = \frac{16 La}{3.14 d^3}$$

where M is the modulus of rupture; L is the load necessary to break the rod (pounds); "a" is one-half the distance between the two supports (inches); and "d"0 is the rod diameter (inches).

Useful temporary binders include certain cellulose ether type binders and/or their derivatives, preferably, methylcellulose and/or its derivatives such as hydroxybutylmethylcellulose, hydroxypropylmethylcellulose, hydroxyethylmethylcellulose, sodium carboxymethylcellulose, and mixtures of these. Preferred sources of cellulose ethers and/or derivatives thereof are the Methocel® A-type binders available from Dow Chemical Company, the most preferred Methocel® A-type binder being Methocel® A4M, a methyl cellulose binder having a gel temperature of 50°–55° C., and a gel strength of 5000 g/cm² (based on a 2% solution at 65° C.). Because of its high gel strength, a Methocel® A4M-containing article is relatively stiff as it is extruded, however, at room temperature, cracks and fissures may form on the skin of the article within hours of shaping because the binder does not develop sufficient gel strength at room temperature. Therefore, it is desirable to quickly develop a large gel strength as the article is formed or soon thereafter, so as to resist subsequent cracking due to drying shrinkage. To aid the gelling of the Methocel® A4M and quickly develop sufficient gel strength, the article can be placed in a drier using any schedule which will develop a large gel strength quickly as the article is formed. For example, the article can be dried at any temperature in the range of 60° to 150° C., preferably, 90°–100° C. Since the Methocel® A4M-containing article can be made to develop a large strength quickly to resist cracking, it can be dried at a fast rate (i.e., using a very short drying schedule) without formation of cracks. Preferably, the article is dried using high intensity energy or electromagnetic radiation, such as microwave, dielectric energy and any such source, as well as conventional drier to quickly dry the article and prevent the formation of blisters and cracks. As stated earlier, solvent-based systems cannot be dried as quickly. As a result, such solvent-based systems remain prone to cracks, blisters and other skin deformations.

In one useful embodiment of the invention, a zeolite batch was prepared having the following composition: ZSM-5 zeolite such as supplied by Mobil Corporation under the designation, MZ-12, 4–6% Methocel A4M available from Dow Chemical Company, aqueous silicone resin emulsions such as supplied by Dow Corning under the designation 1-0468 (to yield a composition of 90 ZSM-5/10 silica after firing), and about 45% water to plasticize the batch, all amounts based on total solids of zeolite and emulsion.

I have found that particularly good zeolite extrudates can be obtained by the further addition of a low molecular weight water-soluble binder to the batch composition. Useful water-soluble binders include certain polyvinyl alcohols such as available from Air Products, Allentown, Pa., under the designation Airvol, for example, Airvol 205 (molecular weight 31,000–50,000), and Airvol 350 (mw 124,000–186, 000). Other useful water-soluble binders include polyvinylpyrrolidones such as available from GAF, Linden, N.J., under the designation PVP K-30 (row 40,000) and PVP K-60 (row 160,000). I have found Airvol 205S to be particularly useful for the practice of the invention.

In one experiment, extruded zeolite structures were formed using a batch containing about 4% Methocel A4M and 2% Airvol 205S, a low molecular weight polyvinyl alcohol, ZSM-5, aqueous silicone resin emulsion 1-0468 and 45.3% water. A zeolite substrate having 25 cells per square inch, 34 mil wall thickness, and 1 inch in diameter was extruded. The substrate exhibited excellent skin quality. The substrate was dried in about 10 minutes in a dielectric oven without the formation of blisters or cracks. Sintered samples yielded good zeolite activity and a Modulus of Rupture (MOR) of 1190 psi (from a rod sample).

To verify that the above composition can be applied to large scale operations, the above composition was scaled up to a 70 pound zeolite batch. Following the same procedure, excellent skin quality was again obtained in extrudates measuring 3¼×3¼ inches in cross-section, and having 25 cells per square inch, 34 mil wall thickness, and 14 inches in length. Four of the samples could be dried in a dielectric oven in 8 minutes with near perfect to perfect skin and cell quality without any blistering or cracks. Fired or sintered samples yielded a crushing strength of 1059 psi. (There is no direct formula connecting crushing strength or compressive strength to MOR. However, *Engineering Property Data on Selected Ceramics*, Volume III, Single Oxides (July, 1981), shows that for particular materials, the ratio of compressive strength to MOR is in the range of 5.9 to 7.8)

It should be understood that the foregoing represent illustrative embodiments of the invention, and are not intended to embody all aspects of the invention. In addition to the above embodiments, it will be clear to persons skilled in the art that numerous modifications and changes can be made to the illustrative embodiments without departing from the intended spirit and scope of the invention.

I claim:

1. A method of producing an extruded honeycomb monolith having substantial strength comprising:
   (a) mixing and forming into a substantially homogeneous body, a mixture comprising (i) molecular sieve material selected from the group consisting of zeolites, metallosilicates, titanosilicates, metalloaluminates, germaniumaluminates, metallophosphates, aluminophosphates, silicoaluminophosphates, metalloaluminophosphates, gallogerminates, gallosilicates, chromosilicates, borosilicates, ferrisilicates and combinations of these, (ii) aqueous silicone resin emulsion, (iii) a temporary binder selected from the group consisting of methylcellulose, ethylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose, and mixtures of these, and (iv) water;
   (b) drying the body; and
   (c) sintering the body to a temperature sufficient to form a catalyst support having substantial strength.

2. The method of claim 1, wherein the molecular sieve is a zeolite selected from the group consisting of ZSM-5, Hyper Y, USY zeolite, faujasite, X zeolite, type L zeolite, mazzite, EMC-2, MAPO-36, AlPO4-5, AlPO4-8, VPI-5, and combinations of these.

3. The method of claim 1, wherein the body is sintered at a temperature in the range of 500° to 1000° C.

4. The method of claim 1, wherein the temporary binder is in an amount in the range of 3–10%, by weight.

5. The method of claim 1, wherein the dry step is accomplished by contacting the body with electromagnetic energy.

6. The method of claim 1, wherein the drying step is accomplished by placing the body in a dielectric oven.

7. A method of producing a an extruded honeycomb monolith having substantial strength and high surface area comprising:

(a) mixing into a substantially homogeneous body
   (i) a zeolite having a surface area of at least 20 m$^2$/g;
   (ii) aqueous silicone resin emulsion;
   (iii) a temporary binder selected from the group consisting of methylcellulose, ethylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose, and mixtures of these; and
   (iv) water;

(b) extruding the body to form a green honeycomb structure;

(c) heating the structure in a dielectric oven for a duration in the range of 5 to 30 minutes to form a crack-free dry structure; and (d) heating or sintering the dried honeycomb structure to a temperature in the range of 500° to 1000° C. for a time period sufficient to form a sintered structure having substantial strength and high surface area.

8. The method of claim 7, wherein the homogeneous body further comprises a low molecular weight, water-soluble co-binder.

9. The method of claim 8, wherein the co-binder comprises polyvinyl alcohol, and polyvinylpyrrolidone.

10. The method of claim 9, wherein the co-binder is a polyvinyl alcohol having molecular weight in the range of 31,000 to 186,000.

11. The method of claim 9, wherein the co-binder is a polyvinylpyrrolidone having molecular weight in the range of 40,000 to 160,000.

12. The method of claim 7, wherein the temporary binder is a methylcellulose having a gel temperature in the range of 50° to 55° C. and a gel strength of about 5000 g/cm$^2$ based on a 2% solution of the binder at 65° C.

13. The method of claim 12, wherein the homogeneous body comprises temporary binder in the amount of 3–10%, by weight.

14. The method of claim 13, wherein the homogenous body comprises temporary binder in the amount of 3–6%, by weight.

15. The method of claim 7, wherein the homogeneous body comprises zeolite in an amount sufficient to yield a sintered structure having a zeolite/silica ratio in the range of 70–90/30–10 by weight.

16. The method of claim 15, wherein the homogeneous body comprises zeolite in an amount sufficient to yield a sintered structure having a zeolite/silica ratio of about 90/10 by weight.

* * * * *